United States Patent [19]
Weiss et al.

[11] 3,860,351
[45] Jan. 14, 1975

[54] BRACE CLAMP

[75] Inventors: Morton A. Weiss, Springfield;
Bernard S. Speckhart, Short Hills, both of N.J.

[73] Assignee: White Machine Co., Kenilworth, N.J.

[22] Filed: Nov. 19, 1973

[21] Appl. No.: 417,341

[52] U.S. Cl. .................................. 403/218, 403/175
[51] Int. Cl. .............................................. F16b 2/02
[58] Field of Search ........... 403/218, 174, 175, 178, 403/191

[56] References Cited
UNITED STATES PATENTS

| | | | |
|---|---|---|---|
| 1,020,123 | 3/1912 | Brampton et al. | 403/174 |
| 1,925,283 | 9/1933 | Searles | 403/110 |
| 2,018,539 | 10/1935 | Welsh | 403/218 |
| 2,287,761 | 6/1942 | Matthysse | 403/191 |
| 2,365,501 | 12/1944 | Walstrom | 403/174 |
| 2,932,028 | 4/1960 | Saul, Sr. | 403/175 |
| 3,682,504 | 8/1972 | Brimberg | 403/218 |

*Primary Examiner*—Werner H. Schroeder
*Attorney, Agent, or Firm*—Thomas Cifelli, Jr.

[57] ABSTRACT

A brace clamp made of sheet metal, said clamp being attachable to an end of a vertical pipe for supporting a horizontally-disposed pipe therefrom.

2 Claims, 7 Drawing Figures

PATENTED JAN 14 1975 3,860,351

3,860,351

BRACE CLAMP

BACKGROUND OF THE INVENTION

Brace clamps, as made heretofore, comprise a pair of complementary castings which include circular portions for engagement with the end portion of a pipe. When such clamp is secured to the pipe, the circular portions form a collar clamped against the pipe by means of bolts and nuts forming part of the assembled clamp. Hence, the clamp is retained in position by the frictional force effective between the surface of the pipe and the walls defining the collar portions of the clamp. Normal variations in the external diameter of the pipe and the internal diameter of the collar walls, often result in a reduced frictional force between these members and, therefore, limits the weight which can safely be supported by the particular clamp.

A brace clamp made in accordance with this invention is made of malleable sheet metal and is constructed and arranged so that upper end of the clamp bites into the pipe when the clamp is attached thereto. This results in a more positive attachment of the clamp to the pipe. Also, the new clamp is of lighter weight than a conventional cast clamp having the same load-carrying capacity.

SUMMARY OF THE INVENTION

A sheet of malleable metal is stamped and drawn to form a pair of matching open, boxlike members which are assembled together by means of a pair of bolts and cooperating nuts. The walls of these members are provided with arcuate cutout portions, which form circular openings for accommodating pipes.

An object of this invention is the provision of a brace clamp of improved construction.

An object of this invention is the provision of a brace clamp formed of sheet metal.

An object of this invention is the provision of a sheet metal brace clamp constructed and arranged to bite into the surface of a pipe when the clamp is attached thereto.

The above-stated and other objects and advantages of the invention will become apparent from the following description when taken with the accompanying drawings. It will be understood, however, that the drawings are for purposes of illustration and are not to be constructed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF PREFERRED EMBODIMENT

Figure 1:
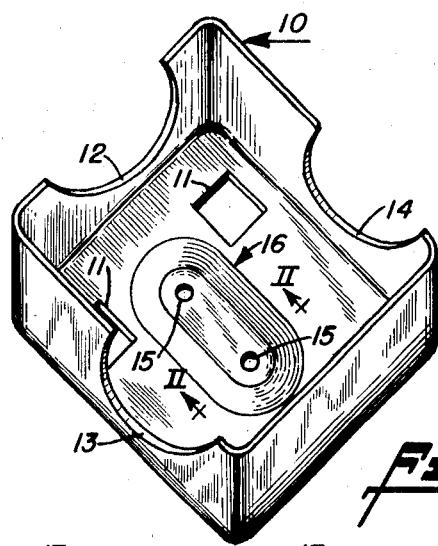
FIG. 1 is an isometric view showing one member of a clamp made in accordance with this invention.
Figure 2:
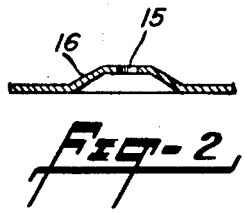
FIG. 2 is a cross-sectional view taken along the line II — II of FIG. 1.

Reference now is made to FIG. 1 showing a member 10 formed from a sheet of a suitable metal, such as malleable iron. The flat sheet is first subjected to a stamping operation to form the square openings 11, the arcuate cutouts 12, 13 and 14, the holes 15, and a bulged portion forming a rib 16, (see also FIG. 2). The stamped sheet then is subjected to a deep drawing operation and formed into the rectangular, open, boxlike configuration, as shown.

Figure 3:
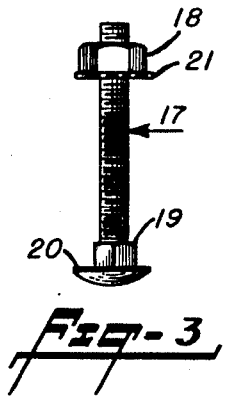
FIG. 3 is an elevational view showing a bolt and nut used for assembling the clamp.
Figure 5:
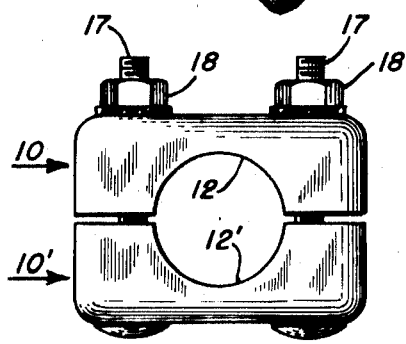
FIG. 5 is a corresponding top plan view.
Figure 4:
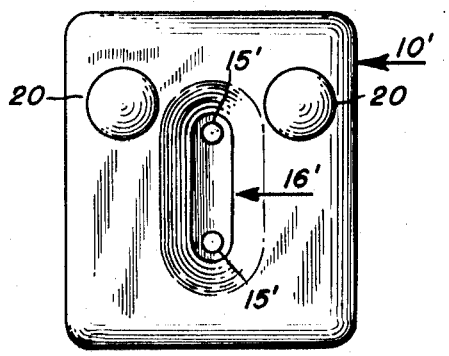
FIG. 4 is a front elevational view of the assembled clamp.
Figure 6:
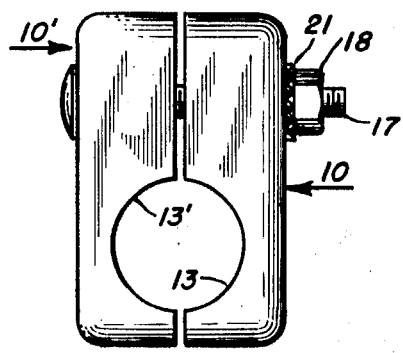
FIG. 6 is a corresponding right end elevational view.

The complete clamp, shown in FIGS. 4–6, comprises the member 10 and an identical member 10' secured together by a pair of bolts 17 and nuts 18. As shown in FIG. 3, the bolt 17 includes a square shank portion 19 terminating in a flat head 20, and the nut 18 inludes an integral lockwasher 21. The square holes 11, (FIG. 1), accommodate the square shank portions of the bolts, thereby preventing the bolts from rotating as the nuts are tightened thereon, as when the clamp is secured to a vertical pipe 22 to support a horizontal pipe 23, as shown in FIG. 7.

Figure 7:
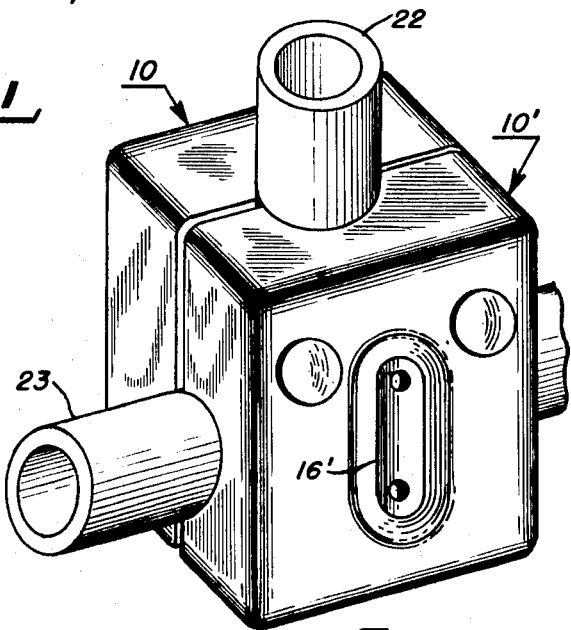
FIG. 7 is an isometric view showing the clamp secured to a vertical pipe and supporting a horizontally-disposed pipe.

As will be noted from FIG. 7, the vertical pipe 22 is engaged by the walls defining the arcuate cutouts formed in the top walls of the clamp members 10, 10', such arcuate openings being identified by the numerals 12, 12' in FIG. 5. The arcuate cutouts 12, 12' lie on a circle having a diameter substantially equal to that of the particular pipe 22 but each such cutout has an angular extent of less than 180°. Thus, when the nuts are fully tightened on the bolts, the bottom wall portions of the cutouts bite into the pipe, thereby minimizing the possibility of relative angular or linear movement between the clamp and the pipe. The inwardly-bulged ribs 16 and 16' (see FIGS. 1 and 7, respectively), add rigidity to the individual clamp members, whereby these members may be made of a somewhat thinner gauge metal than would otherwise be required for a clamp designed for use under given load conditions. The depth of the ribs may be such that the ribs are pressed against the vertical pipe 22, thereby adding somewhat to the clamping force exerted by the two clamp members 10, 10' against such pipe. Under vibrating conditions it may be desirable to secure the horizontal pipe to the clamp. In such case, the holes 15 (FIG. 1) may be threaded to receive screws which are tightened into end engagement with the pipe.

Having now described the invention what we desire to protect by letters patent is set forth in the following claims.

We claim:

1. A clamp for supporting a horizontally disposed pipe from an end portion of a vertical pipe, which clamp comprises, a. first and second similar members made of sheet metal, each member having a base terminating in upstanding top, bottom and side walls, b. first arcuate cutouts formed in the top walls of said members, said cutouts forming a first circular opening having a diameter substantially equal to that of the vertical pipe and each cutout having an angular extent of less than 180°, c. second arcuate cutouts formed in the side walls of said members, said cutouts forming a second circular opening, d. third arcuate cutouts formed in the other side walls of said members, said cutouts forming a third circular opening which is aligned with the said second circular opening for receiving the horizontally-disposed pipe,
e. means forming a pair of generally-square openings in the base of the first member, which openings are located above the arcuate cutouts formed in the side wall of such member,
f. means forming a pair of circular openings in the base of the second member, which circular openings are aligned with the said openings formed in the base of the first member,
g. fastening bolts passing through the aligned openings formed in the bases of the two members, each bolt including a generally square shank portion disposed within the associated square opening, and
h. nuts threaded onto the ends of said bolts; the arrangement being such that upon tightening the nuts the walls defining the said first circular opening bite into the surface of the vertical pipe.

2. The invention as recited in claim 1, including inwardly bulging ribs formed in the bases of said members.

* * * * *